US007228003B2

(12) United States Patent
Brown

(10) Patent No.: US 7,228,003 B2
(45) Date of Patent: Jun. 5, 2007

(54) FLAT-FIELD, PANEL FLATTENING, AND PANEL CONNECTING METHODS

(75) Inventor: Carl S. Brown, Seattle, WA (US)

(73) Assignee: Applied Precision, LLC, Issaquah, WA (US)

( * ) Notice: Subject to any disclaimer, the term of this patent is extended or adjusted under 35 U.S.C. 154(b) by 176 days.

(21) Appl. No.: 10/872,293

(22) Filed: Jun. 18, 2004

(65) Prior Publication Data

US 2005/0008207 A1      Jan. 13, 2005

Related U.S. Application Data

(62) Division of application No. 09/771,343, filed on Jan. 26, 2001, now abandoned.

(60) Provisional application No. 60/178,476, filed on Jan. 27, 2000.

(51) Int. Cl.
*G06H 9/00*       (2006.01)
*G06H 9/36*       (2006.01)

(52) U.S. Cl. .................. 382/266; 382/262; 382/277; 382/275

(58) Field of Classification Search ............ 382/262, 382/266, 274, 275
See application file for complete search history.

(56) References Cited

U.S. PATENT DOCUMENTS

| 4,979,824 | A | 12/1990 | Mathies et al. |
| 5,675,513 | A | * 10/1997 | Hammer ................ 702/86 |
| 5,875,258 | A | 2/1999 | Ortyn et al. |
| 5,974,113 | A | 10/1999 | Bruijns et al. |
| 6,101,238 | A | 8/2000 | Murthy et al. |
| 6,111,596 | A | 8/2000 | Haskell et al. |
| 6,556,690 | B1 | * 4/2003 | Nelson ................ 382/100 |

FOREIGN PATENT DOCUMENTS

| JP | 08-215182 | 8/1996 |
| JP | 10-145595 | 5/1998 |
| JP | 11-196299 | 7/1999 |
| WO | 98/02844 | 1/1998 |

OTHER PUBLICATIONS

Ye et al. "An efficient algorithm to correct range curvature image distortion in spotlight SAR" European Conference on Synthetic Aperture Radar. pp. 123-126.*

* cited by examiner

*Primary Examiner*—Matthew C. Bella
*Assistant Examiner*—Patrick Edwards
(74) *Attorney, Agent, or Firm*—Pillsbury Winthrop Shaw Pittman LLP

(57) ABSTRACT

A plurality of panels are assembled into a single image. Each of the panels may have different intensities throughout the panel, as well as non-uniformities between panels. The panels are modified using flat-field calibration, panel flattening, and panel connecting techniques. These techniques correct for non-uniformities and provide a cleaner, single image.

5 Claims, 3 Drawing Sheets

Simple Stitch                    300

Panel Curvature Flattening       305

Flat Field Calibration
548nm EX, 595nm EM

Flat Field Calibration
20x20 region-of-Interest

Panel Curvature Flattening

Simple Stitch

FLAT-FIELD, PANEL FLATTENING, AND PANEL CONNECTING METHODS

CROSS-REFERENCE TO RELATED APPLICATIONS

This application is a divisional of U.S. application Ser. No. 09/771,343 filed Jan. 26, 2001 now abandoned, which claims benefit of U.S. Provisional Application Ser. No. 60/178,476 filed Jan. 27, 2000 the entire contents of both of which are incorporated herein by reference.

TECHNICAL FIELD

This invention relates to image analysis, and more particularly to using correcting for non-uniformities among several panels of a single image.

BACKGROUND

Biomedical research has made rapid progress based on sequential processing of biological samples. Sequential processing techniques have resulted in important discoveries in a variety of biologically related fields, including, among others, genetics, biochemistry, immunology and enzymology. Historically, sequential processing involved the study of one or two biologically relevant molecules at the same time. These original sequential processing methods, however, were quite slow and tedious. Study of the required number of samples (up to tens of thousands) was time consuming and costly.

A breakthrough in the sequential processing of biological specimens occurred with the development of techniques of parallel processing of the biological specimens, using fluorescent marking. A plurality of samples are arranged in arrays, referred to herein as microarrays, of rows and columns into a field, on a substrate slide or similar member. The specimens on the slide are then biochemically processed in parallel. The specimen molecules are fluorescently marked as a result of interaction between the specimen molecule and other biological material. Such techniques enable the processing of a large number of specimens very quickly.

Some applications for imaging require two apparently contradictory attributes: high-resolution and high-content. The resolution requirement is driven by the need to have detail in the image that exceeds by at least 2× the information content of the object being images (the so called Nyquist Limit). The content requirement is driven by the need to have information over a large area. One method that addresses these needs is to acquire a plurality of individual images with high spatial resolution (panels) and to collect these panels over adjacent areas so as to encompass the large desired area. The multiple panels can then be assembled into a single large image based on the relative location of the optics and the sample when each panel was collected. When assembling the plurality of panels into a single montage, a number of steps may be taken to correct for intensity non-uniformities within each panel (known herein as flat-field Calibration and Panel Flattening) as well as non-uniformities in the panel to panel intensities.

DESCRIPTION OF DRAWINGS

These and other features and advantages of the invention will become more apparent upon reading the following detailed description and, upon reference to the accompanying drawings.

DETAILED DESCRIPTION

To create a large image, a plurality of smaller images are collected by a detector and assembled into a single large image. Each of the plurality of smaller images collected by the detector may be affected by a combination of the non-uniform optics and detector response. In the case of the optics, illumination vignetting and collection vignetting introduce a substantial intensity curvature to the images collected by the detector. Non-uniform detector response comes in the form of gain and offset differences among all the detector elements.

To correct for these errors, a series of images are acquired that range from dark current (no exposure) to near full-well. Linear regression of each pixel in the detector yields a slope (gain) and intercept (offset). That is, for each pixel the following equation is solved for m and b:

Measured_image=Desired_image*$m$+$b$

Flat-field calibration is then accomplished with the following calculation (again for each pixel):

Desired_image=(Measured_image−offset_map)/gain_map

Where m has been replaced with "gain_map" and b with "offset_map".

The gain and offset maps correct for the illumination optics, collection optics, and detector non-uniformity at the same time.

Flat-field calibration maps that correct the image field curvature and offset problem do so at the expense of adding noise to the image. Both maps contain measurement noise that is then passed on to the calibrated image. The gain map contains noise that is mostly photon counting noise ("shot noise"), whereas the offset map is dominated by the electronic read-noise of the CCD camera.

Figure 1:
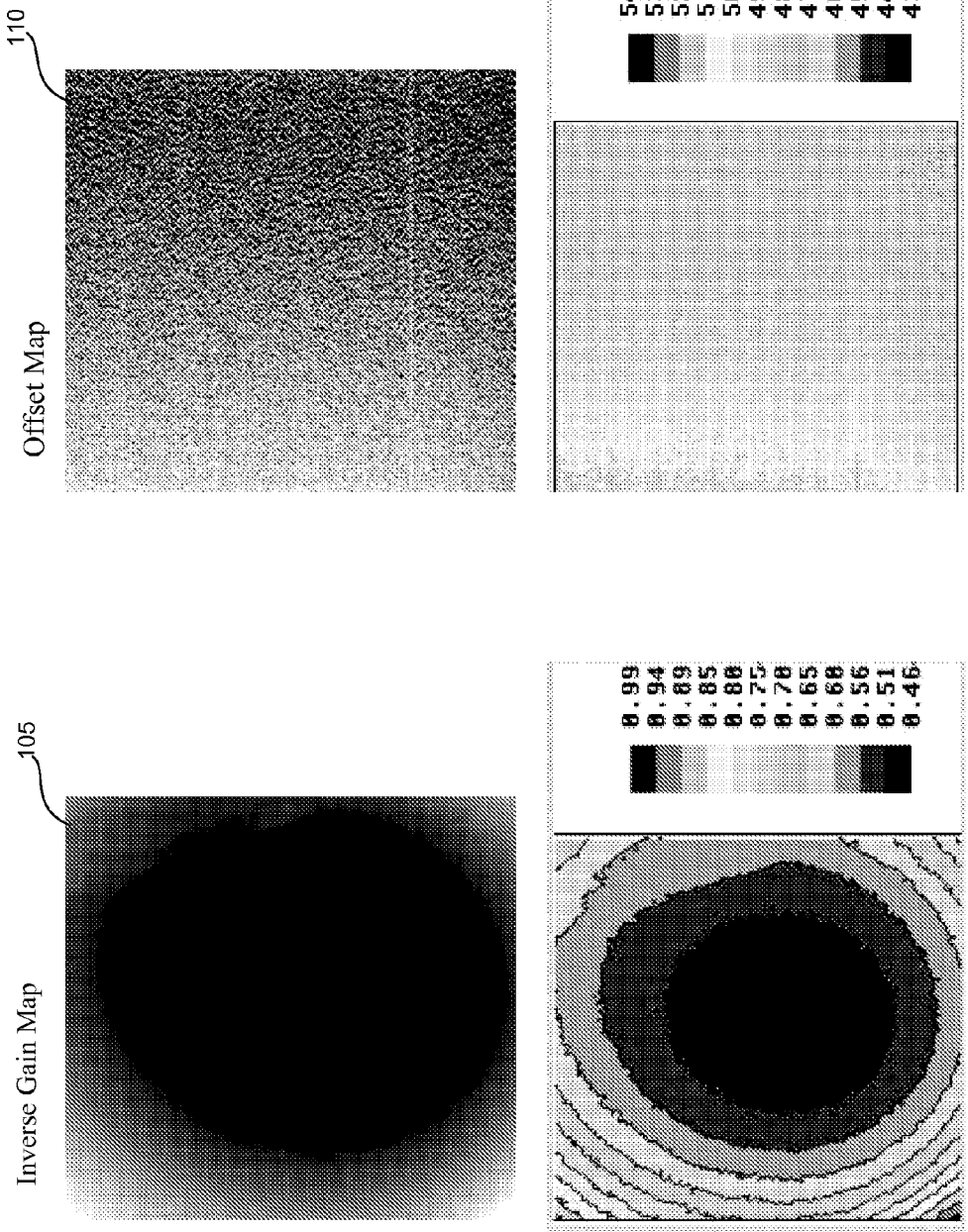
FIG. 1 is a flat-field calibration map showing the overall curvature and offset maps according to one embodiment of the present invention.
Figure 2:
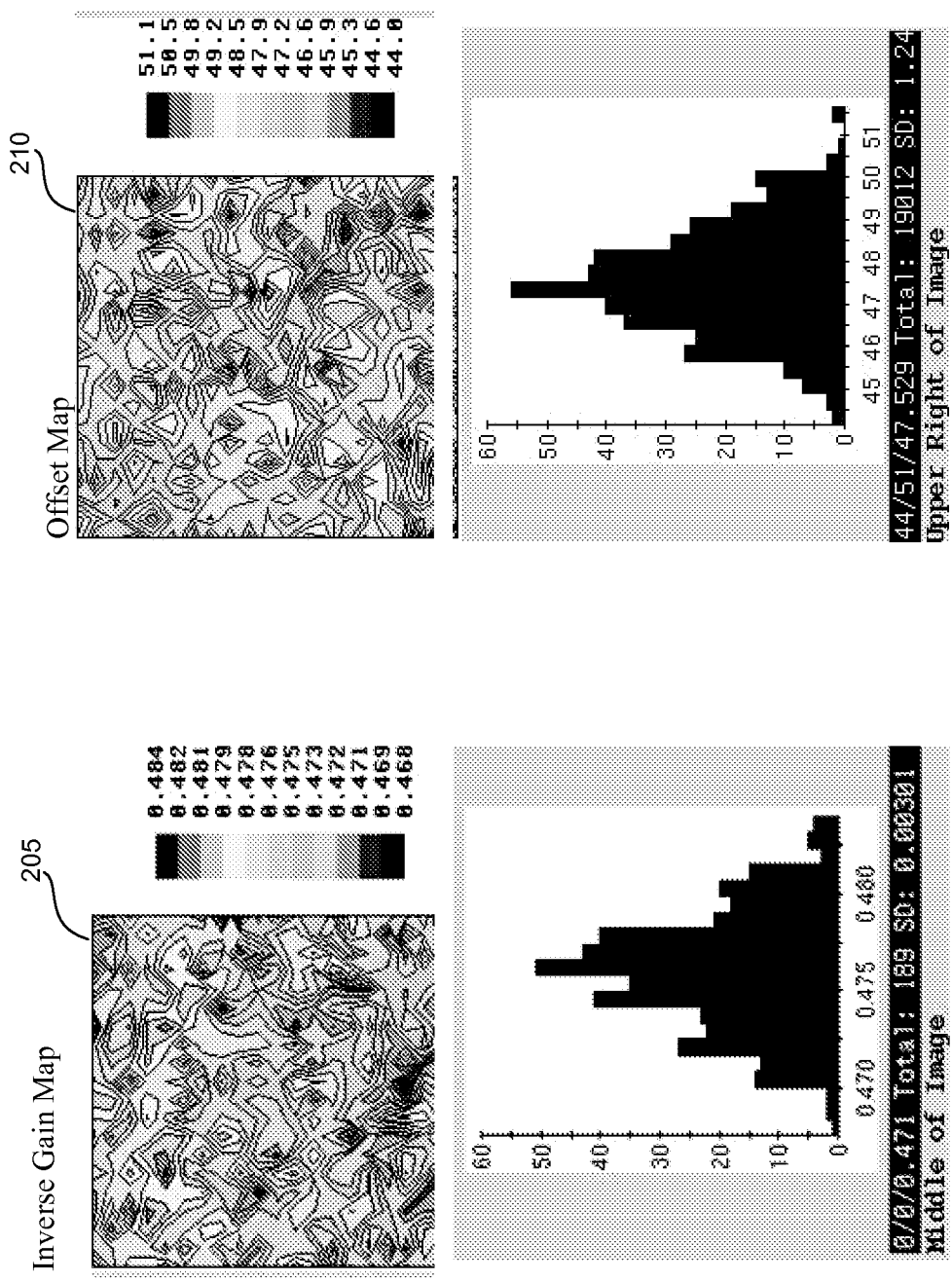
FIG. 2 is a close-up view of a 20×20 region of the inverse gain map and offset map of FIG. 1.

To correct for the offset map noise, the average dark current image (no exposure) may be used instead of the linear regression result. That is, the offset_map used to flat-field images is the average of many dark current images rather than the intercept calculated by the linear regression. Experience has shown that the intercept is inherently noisy (the intercept is measured at the low signal-to-noise part of the camera range). Use of the calculated offset map reduces the sensitivity of the instrument by increasing the baseline noise. The offset map shown in FIGS. 1 and 2 are the average dark current. The calculated intercept would have about double the noise of the average dark current.

Averaging multiple frames for each measurement improves the signal-to-noise of the data and reduces the noise in the resulting gain and offset maps (in the event that the calculated offset map is used for flat-fielding).

Another technique is to smooth the gain map with a low-pass filter.

Perfectly uniform flat-field calibration slides are nearly impossible to fabricate. Non-uniform fluorescence is typical even with very carefully prepared slides. However, moving the calibration slide during camera exposure averages non-uniform fluorescent response of the slide. Flat-field calibration maps can be generated from significantly lower quality calibration slides.

FIGS. 1 and 2 illustrate flat-field calibration maps made from uniformly fluorescent calibration slides. The gain map 105, 205 contains approximately 0.3% noise whereas the offset map 110, 210 contributes 1.24 counts (gain correction is multiplicative, offset is additive).

Although flat-field calibration is an effective technique, the technique introduces noise. Cleaning the flat-field calibration maps could yield substantial improvements in image quality. In particular, further reduction of offset map noise would improve low-end sensitivity. The read-noise in the CCD camera used to collect the maps above has about 1.77 counts of read-noise. Adding the offset map noise (in quadrature) yields about 2.2 counts of baseline noise, a 24% increase.

Figure 3:
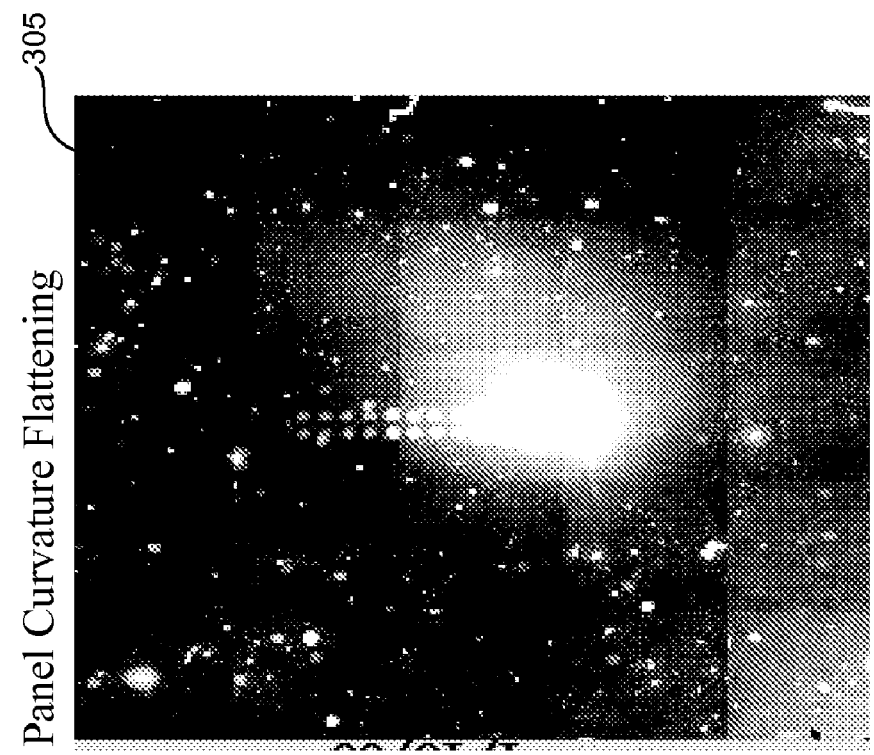
FIG. 3 illustrates an image before and after applying curvature flattening according to one embodiment of the present invention.
Figure 3:
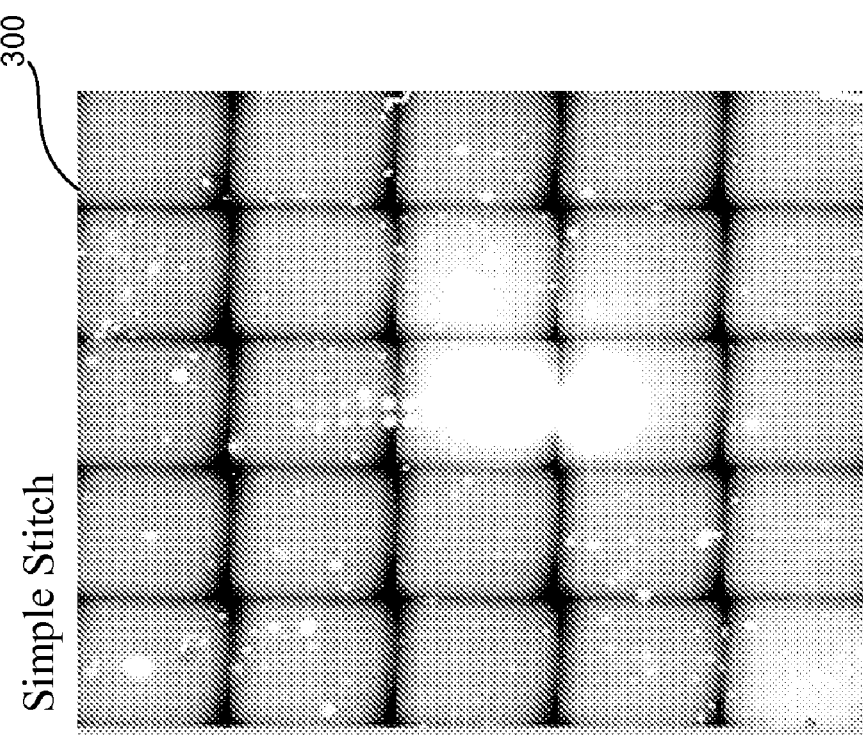

Another problem is that the intensity curvature of the panels creates a visible artifact. FIG. 3 illustrates an image 300 without any curvature correction. A combination of illumination vignetting and collection vignetting leads to more brightness or higher collection efficiency, respectively, in the center of the field-of-view. Even when flat-fielding techniques have been applied to the panels, a variety of factors contribute to a residual curvature. For instance, lamp fluctuation, camera bias instability change the general intensity level of the acquired image and affect the standard flat-fielding calculation, which is:

flat_image=(acquired_image−offset_map)/gain_map.

Small errors in the offset map cause the gain map (which is usually curved) to introduce a field curvature. The more curvature that exists in the acquired image, the greater the potential for residual curvature.

Because the intensity curvature is typically consistent from one panel to the next, averaging the intensity profile of each panel gives an average curvature map. Dividing each panel by the curvature map is then a way to flatten the intensity curvature that is consistent among all panels. Normalizing the curvature map by the average intensity, or similar value, of the curvature map allows the calculation to be performed without altering the net intensity scale of the image.

One example of how to average the intensity profile of each panel is to perform the following procedure for each pixel in each panel. First, if the pixel in the current panel is not signal, apply the following equations:

Accumulator_map=accumulator_map+pixel_intensity

Accumulation_counter_map=accumulation_counter_map+1

Second, for all pixels within the accumulator_map, calculate the curvature map using the following technique:

If counter_map is greater than 0

Curvature_map=accumulator_map/accumulation_counter_map

Otherwise

Curvature_map=average of neighboring curvature values

This creates a curvature flattening map that is defined as:

Curvature_flattener=1/curvature_map

The procedure may be refined in several manners. First, the curvature map may be smoothed to reduce the sensitivity to noise and spurious signals in the average curvature image. Second, only the pixels from each panel that are not significantly above the background intensity may be averaged. A histogram of each panel is used to distinguish background areas (desired) from image signals (undesired). A map of the number of pixels added to each point in the curvature map is then required to calculate the average since not all panels contribute information to each pixel in the curvature map. Pixels that contain no information can be synthesized from the average of neighboring pixels. Third, the curvature map may be curve-fitted using a weighting scheme that emphasizes relatively low intensity values. Curve-fitting would be useful for reducing noise. The goal of curve-fitting is to measure only the background curvature and reduce the influence of the image signal. Other refinements include averaging lots of small panels reduces sensitivity to image signal corruption and over-scanning the desired image area to provide more panels for averaging and panels that contain only the background intensity curvature.

Another problem with combining a plurality of small images to form one large image is that small discontinuities between adjacent panels become visible. Intensity differences of 1–2 counts are readily detected by the human eye, even in the presence of 1–2 counts of random noise and when remaining important information is much more intense. The remaining discontinuity create a visible stitching artifact. Examples of the discontinuities may be seen in the image 300 of FIG. 3.

To correct this problem, a panel edge connection technique is performed. In this technique, the border of each panel is compared with all neighbors to the left, right, top, and bottom. This comparison generates border intensity scaling values for the entire boundary of each panel. The boundary may then be scaled so that the result is half way between the boundary of the current panel and the adjacent panel. The intensities are then connected at the half-way point between the adjacent border intensities. The boundary scaling may be applied to each pixel in the panel based on the distance from the four boundaries. A weighted combination of the scaling factors is used such that a continuous intensity ramp is applied from one boundary to the next. (In the middle of the image, the scaling factor should be the average of the left, right, top, and bottom scaling factors.) Some examples of the weighting methods include inverse square weighting and inverse weighting. These techniques may be implemented using the following formulas:

Inverse square weighting:

Left_weight=$1/(i+1)^2$

Right_weight=$1/(nx-i+1)^2$

Bottom_weight=$1/(j+1)^2$

Top_weight=$1/(ny-j+1)^2$

Inverse weighting:

Left_weight=$1/(i+1)$

Right_weight=$1/(nx-i+1)$

Bottom_weight=$1/(j+1)$

Top_weight=$1/(ny-j+1)$

Total_weight=Left_weight+Right_weight+Top_weight+Bottom_weight

Scaling Factors:

$$\text{Left\_scale}(j) = \tfrac{1}{2} * [\text{Left\_border}(j) + \text{Right\_border\_of\_left\_panel}(j)] / \text{Left\_border}(j)$$

$$\text{Right\_scale}(j) = \tfrac{1}{2} * [\text{Right\_border}(j) + \text{Left\_border\_of\_right\_panel}(j)] / \text{Right\_border}(j)$$

$$\text{Top\_scale}(i) = \tfrac{1}{2} * [\text{Top\_border}(i) + \text{Bottom\_border\_of\_upper\_panel}(i)] / \text{Top\_border}(i)$$

$$\text{Bottom\_scale}(i) = \tfrac{1}{2} * [\text{Bottom\_border}(i) + \text{Top\_border\_of\_lower\_panel}(i)] / \text{Bottom\_border}(i)$$

$$\text{Pixel}(i, j) \text{ intensity scaling factor} = [\text{Left\_scale}(j) * \text{Left\_weight} + \text{Right\_scale}(j) * \text{Right\_weight} + \text{Bottom\_scale}(i) * \text{Bottom\_weight} + \text{Top\_scale}(i) * \text{Top\_weight}] / \text{Total\_weight}$$

Definitions:
nx Number of pixel columns
ny Number of pixel rows
i Column number (0 based)
j Row number (0 based)

Both connection and curvature flattening are important for panels with significant background intensity. An image having curvature flattening is shown in FIG. 3. Further refinements include median filtering the boundary scaling values to reduce sensitivity to outliers. Misalignment of the panels causes miscalculation of the scaling factors. The miscalculation is significant when bright (or dark) spots do not overlap along the borders of adjacent panels. Additionally, smoothing of the median filtered boundary scaling values may be used to remove spikes caused by alignment problems. Finally, the boundary scaling values may be curve-fit to find the general trend and avoid noise and misalignment.

Numerous variations and modifications of the invention will become readily apparent to those skilled in the art. Accordingly, the invention may be embodied in other specific forms without departing from its spirit or essential characteristics.

What is claimed is:

1. A method of reducing field curvature in an image comprising:

obtaining an average curvature map of a plurality of image panels; and dividing each panel by the curvature map.

2. The method of claim 1, further comprising normalizing the curvature map by the average intensity of the curvature map.

3. The method of claim 1, further comprising smoothing the curvature map.

4. The method of claim 1, further comprising using only pixels below signal threshold to obtain the average curvature map.

5. The method of claim 1, further comprising reducing noise in the image by curve-fitting the image pixels.

* * * * *